June 2, 1953   E. V. BRISCOE   2,640,286
DITCH CLEANER AND RIDGER
Filed April 11, 1950   4 Sheets-Sheet 1

INVENTOR
*Ernest V. Briscoe*
BY
ATTORNEYS

June 2, 1953  E. V. BRISCOE  2,640,286
DITCH CLEANER AND RIDGER
Filed April 11, 1950  4 Sheets-Sheet 3

INVENTOR
*Ernest V. Briscoe*
BY
ATTORNEYS

June 2, 1953  E. V. BRISCOE  2,640,286
DITCH CLEANER AND RIDGER
Filed April 11, 1950  4 Sheets-Sheet 4
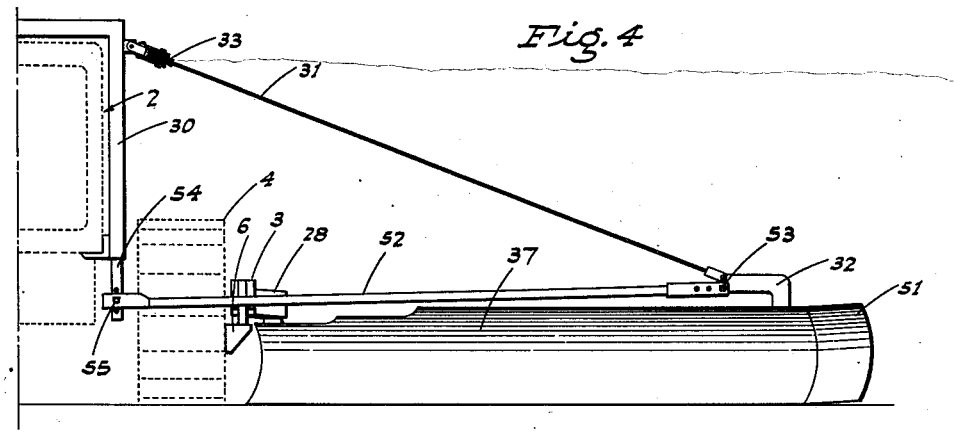
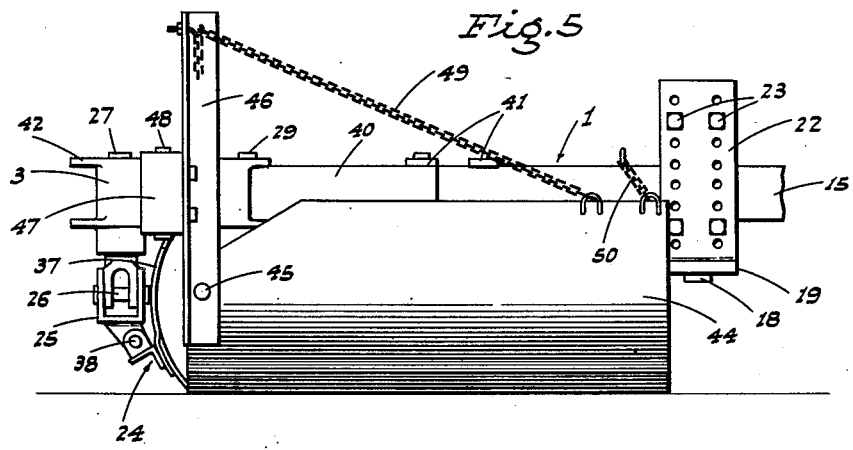
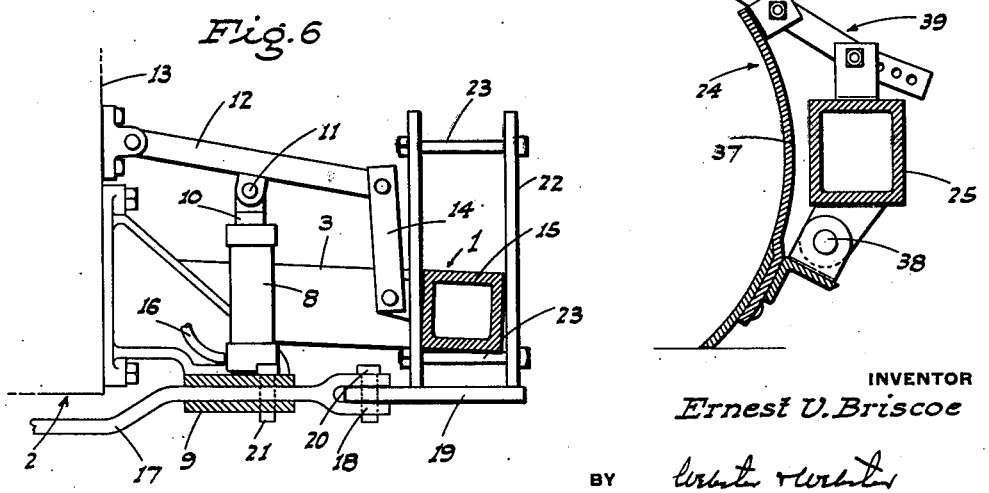
INVENTOR
Ernest V. Briscoe
BY
ATTORNEYS Patented June 2, 1953

2,640,286

UNITED STATES PATENT OFFICE 2,640,286

DITCH CLEANER AND RIDGER

Ernest V. Briscoe, Kerman, Calif.

Application April 11, 1950, Serial No. 155,195

7 Claims. (Cl. 37—155)

1

The present invention relates in general to an earth working implement of elongated blade type adapted to be mounted on a tractor or the like for use.

A primary object of the invention is to provide an earth working implement which is especially adapted, but not limited, for use to clean and grade ditch banks, or to form ridges or checks in fields preparatory to planting a crop.

Another object of the invention is to provide an earth working implement which includes an elongated laterally disposed blade which, when in use, extends lengthwise in forwardly and outwardly diverging relation to the line of travel; there being a novel adjustable mount for the blade which permits the latter to be set at a forward and downward incline to work in a ditch along the bank to clean and grade the same, or set substantially horizontally to work the surface of a field to form a ridge or check.

A further object of the invention is to provide an earth working implement, as above, wherein the mount is vertically adjustably secured in connection with the tractor in a novel manner; the mount including a vertically swingable draft frame straddling the tractor at the rear, and there being a hydraulic power cylinder operative to adjust the vertical position of said draft frame.

An additional object of the invention is to provide an earth working implement, of the type described, which embodies, in cooperation with the upper end of the elongated blade, a novel spoil wing adapted to spread the earth which is swept on top of the ditch bank by said blade as the tractor advances along said bank.

It is also an object of the invention to provide an earth working implement designed for ease and economy of manufacture, and ready attachment to or detachment from a tractor.

It is also an object of the invention to provide a practical and reliable earth working implement, and one which will be exceedingly effective for the purpose for which it is designed.

These objects are accomplished by means of such structure and relative arrangement of parts as will fully appear by a perusal of the following specification and claims.

In the drawings:

Fig. 4 is a front elevation of one blade assembly adjusted as in Fig. 3.

Fig. 5 is an enlarged rear end elevation of one blade assembly, including a spoil wing and its mounting.

Fig. 6 is a fragmentary sectional elevation off the draft frame and the power means for adjusting the same; the view being taken on line 6—6 of Fig. 3.

Fig. 7 is a transverse section through one of the blade assemblies.

Figure 1:
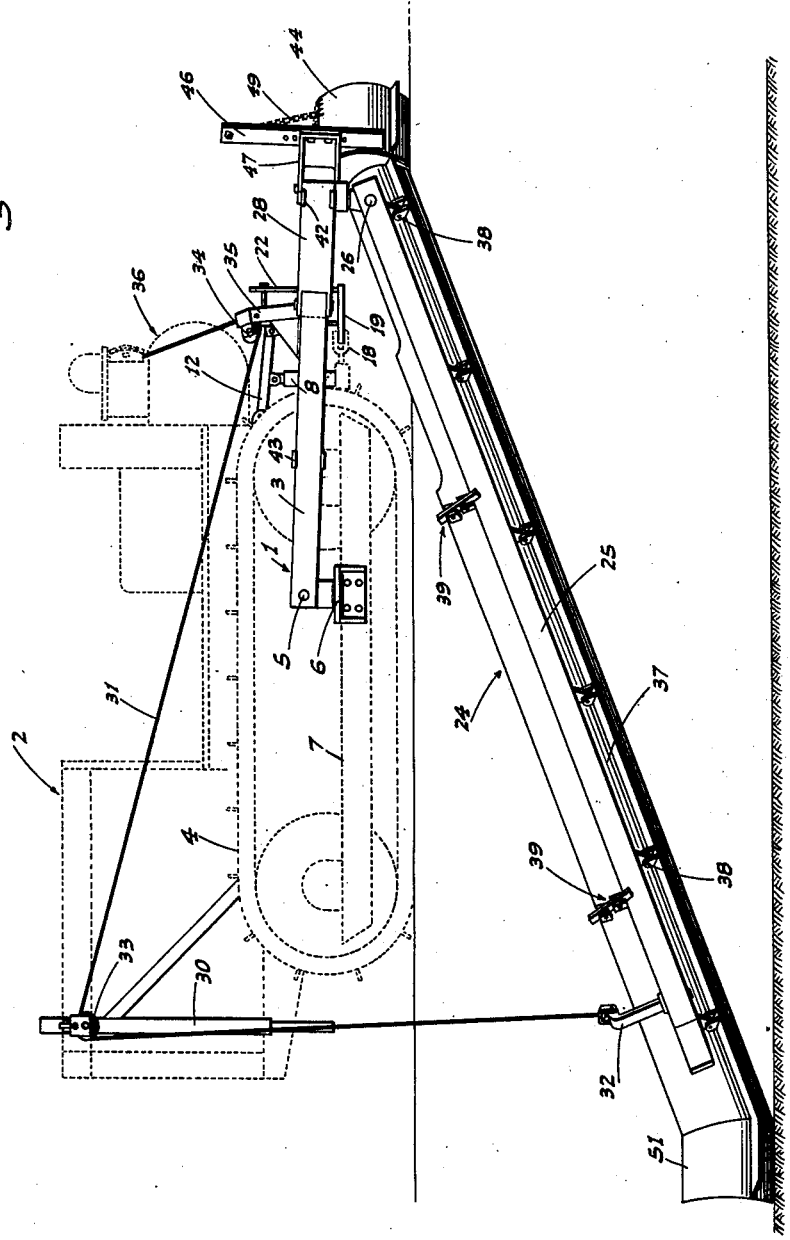
Fig. 1 is a side elevation of one of the blade assemblies adjusted to work in a ditch to clean and grade the bank along which the tractor is traveling.

Referring now more particularly to the characters of reference on the drawings, the implement comprises a heavy-duty, U-shaped draft frame, indicated generally at 1, adapted to straddle a tractor 2 from the rear, with the side legs 3 of such draft frame projecting forwardly outside the endless tracks 4.

At their forward ends the side legs 3 of the draft frame 1 are pivoted, as at 5, to brackets 6 attached to the track frames 7 of the tractor, whereby said draft frame 1 is vertically swingable.

Vertical adjustment of the draft frame 1 is accomplished by the following mechanism:

A pair of hydraulic power cylinders 8 are mounted in transversely spaced, upstanding relation on the drawbar platform 9 at the rear of the tractor; the upwardly projecting piston rod 10 of each cylinder 8 being pivotally connected, as at 11, to a corresponding, longitudinal, vertically swingable arm 12 pivoted, at its front end, to the rear end 13 of the tractor, and pivoted, at its rear end, to the upper end of a depending swing link 14. Each depending swing link 14 is pivotally attached to the rear cross beam 15 of the draft frame 1.

The hydraulic cylinders 8 are controlled, by the tractor operator from adjacent the seat, by means of a valve regulated, fluid pressure supply system, not shown in full, but which includes conduits 16 which lead from the cylinders 8.

By simultaneous operation of the cylinders 8 the draft frame 1 may be set at any selected position of vertical adjustment.

To limit upward swinging of the draft frame 1, and to support it in its lowermost position, the following arrangement is provided:

The numeral 17 indicates the drawbar of the tractor, which drawbar includes a clevis 18 rearwardly of the platform 9.

A tongue 19 is held in the clevis by a removable pin 20, and lateral swinging of the drawbar 17 is prevented by a lock pin 21 which extends through said drawbar and the platform 9.

Rearwardly of the clevis 18 the tongue 19 supports a pair of longitudinally spaced, upstanding plates 22 between which the rear cross beam 15 is vertically movable.

The upstanding plates 22 are connected by vertically adjustable upper and lower sets of bolts 23, and by adjusting such sets the limit of upward and downward motion of said rear cross beam 15, and consequently the entire draft frame 1, may be predetermined. When the rear cross beam 15 is resting on the lower set of bolts 23, the power cylinders 8 are relieved of the load.

A longitudinal blade assembly, indicated generally at 24, is secured in connection with, and extends forwardly from, each rear corner of the draft frame 1, whereby such a blade assembly is available at either side of the tractor 2 for use.

As the blade assemblies are both of identical construction and function, a description of one will suffice:

Each blade assembly 24 comprises a heavy-duty, longitudinal beam 25 secured, at its rear end, by a transverse pivot 26 to the lower end of an upstanding spindle 27 journaled in the outer end of an extension arm 28 which diagonals rearwardly and outwardly from pivotal connection, as at 29, with the adjacent corner of the draft frame 1. This arrangement supports the longitudinal beam 25 for lateral swinging adjustment from a non-use or transport position closely alongside the tractor and parallel thereto, to a position projecting forwardly and outwardly in diverging relation to the tractor. See the positions of the respective longitudinal beams 25 on opposite sides of the tractor, as in Fig. 2. Additionally, by reason of the pivotal connection 26, the longitudinal beam 25 is vertically swingably adjustable from a substantially horizontal position, to a forwardly and downwardly inclined position as in Fig. 1.

The longitudinal beam 25 is adjustably suspended from the front of the tractor, as follows:

The tractor is fitted, at the front, with an upstanding arch frame 30, and a cable 31 leads from an inverted L-shaped hanger arm 32 on the outer end of said beam; such cable extending from the hanger arm upwardly and inwardly to and about a direction-changing sheave 33 on the adjacent side of the arch frame 30.

From the direction-changing sheave 33 the cable 31 runs rearwardly lengthwise of the tractor and about another direction-changing sheave 34 on the upper end of a post 35 upstanding from the corresponding corner of the draft frame 1. From the sheave 34 the cable 31 runs inwardly to the corresponding drum of an operator-controlled power winch 36 on the rear of the tractor.

A longitudinal blade 37 is disposed adjacent but laterally inwardly of the longitudinal beam 25, and extends the full length of the latter; such blade being arcuate in cross section and facing toward the tractor.

The longitudinal blade 37 is connected to the beam 25 for lateral tilting adjustment by means of a plurality of longitudinally spaced pivotal connections 38 between the lower portion of the back side of the blade and the bottom of the beam 25. Also, a plurality of longitudinally spaced adjustment links 39 connect between the top of the beam 25 and the back side of the top of the blade.

With the above arrangement the blade 37 can be set to any desired transverse cant or working position.

For certain types of service, a hydraulic unit of the telescopic type may be employed instead of the cable arrangement above described.

In order to prevent longitudinal displacement of the blade assembly 24 relative to the tractor when the implement is in use, a stay bar 40 is pivotally connected, at its outer end, to the corresponding end of the extension arm 28, and thence extends at a forward and inward diagonal to selective connection with one of a pair of transversely spaced attachment ears 41 on the rear cross beam 15 of the draft beam 1. In certain wide angle positions of adjustment of the beam 25 and blade 37, wherein the extension arm 28 is swung forwardly to a considerable extent, the stay bar 40 is detached from its position, as in Fig. 2, and is reconnected between an ear 42 on the opposite side of the extension arm 28 and another ear 43 on the adjacent side leg 3 intermediate its ends.

In cooperative relation to the rear end of the longitudinal blade 37, the implement includes a rearwardly and inwardly diagonaled spoil wing or blade 44 mounted as follows:

At its outer end the spoil wing 44 is pivoted, for vertical swinging adjustment, as at 45, to the lower end portion of a post 46; the post in turn being fixed to a connection arm 47 which is pivoted to the adjacent end of the extension arm 28, as at 48, for horizontal swinging of said spoil wing.

Vertical adjustment of the spoil wing 44 about the pivot 45 is accomplished by means of an adjustable length suspension chain 49 which extends between the outer end of said spoil wing and the upper end of the post. Horizontal adjustment of the spoil wing 44 is accomplished by an adjustable draft chain 50 which extends between the outer end of said spoil wing and the rear cross beam 15.

At its outer end the longitudinal blade 37 is fitted with an up-tilted end wing 51 to prevent spillage about the outer end of said blade.

Figure 2:
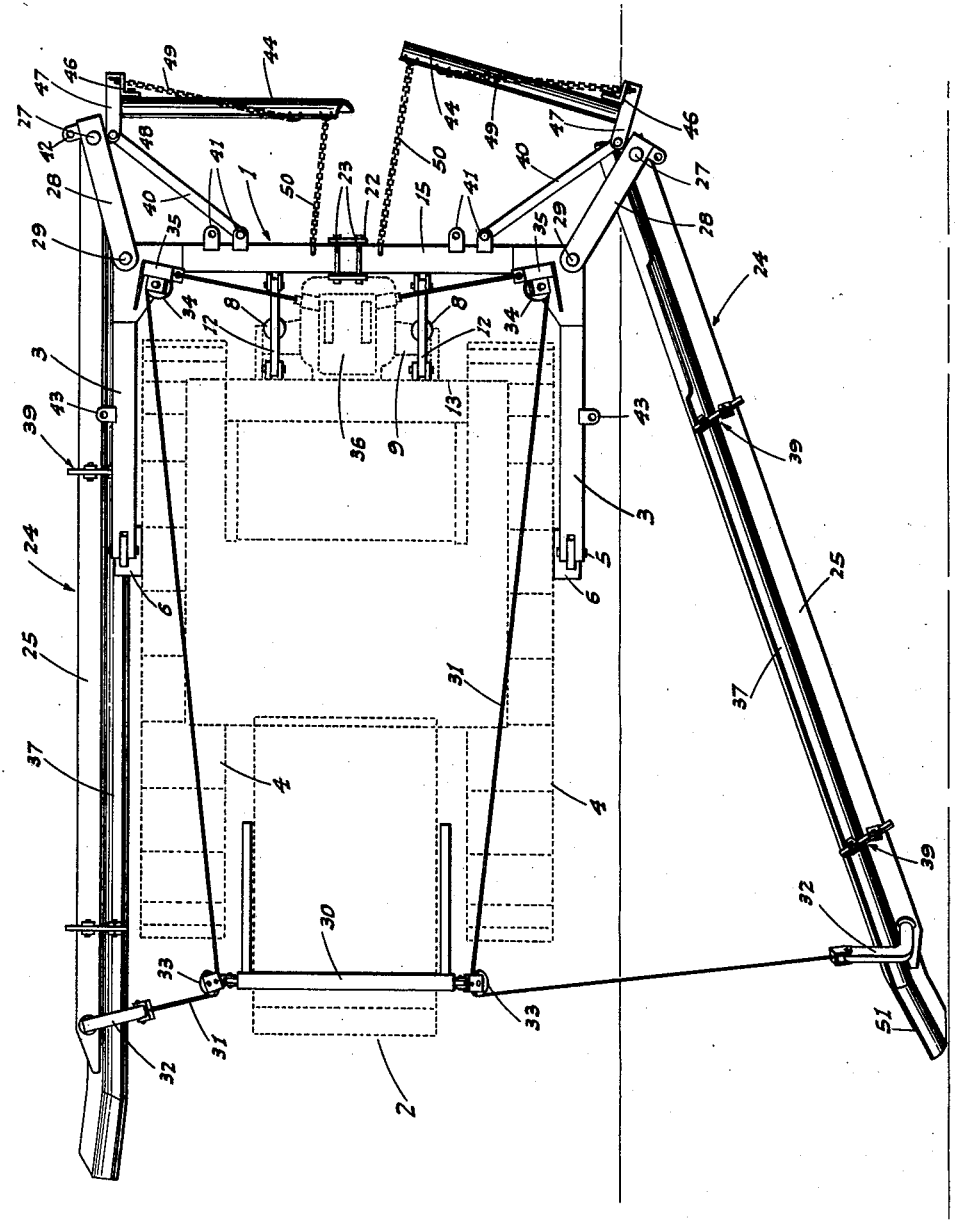
Fig. 2 is a top plan of the implement as mounted on a tractor, with one of the blade assemblies in working position in a ditch, as in Fig. 1.
Figure 3:
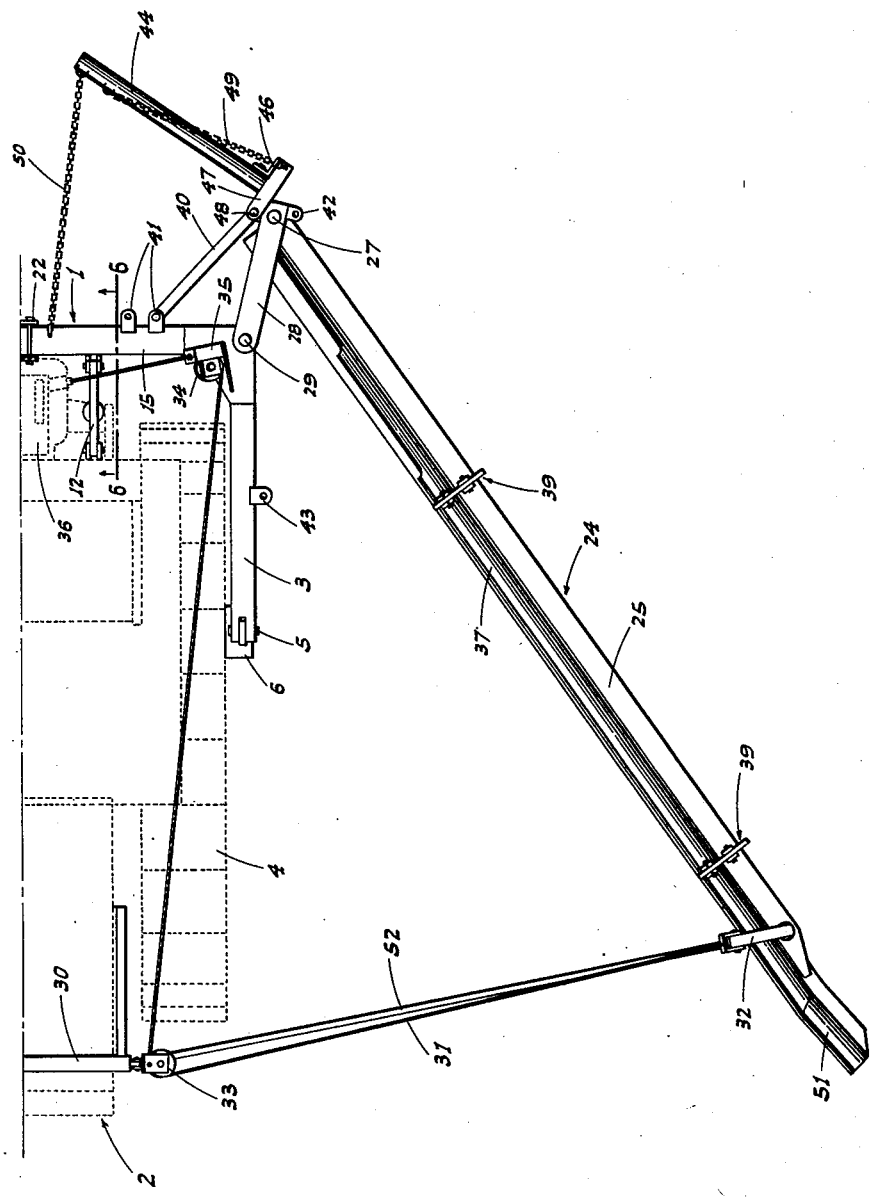
Fig. 3 is a fragmentary plan view showing one of the blade assemblies as adjusted for use to form a ridge or check in a field.

When one of the blade assemblies 24 of the implement is in use to clean and grade a ditch bank, with the tractor traveling along the top of the bank, such assembly is adjusted to the position shown in Figs. 1 and 2, with the longitudinal beam 25 and blade 37 extending forwardly and outwardly in diverging relation to the direction of travel, and also inclining downwardly into the ditch.

With advance of the tractor, the blade 37 works the adjacent ditch bank to clean and grade the same; the spoil feeding upwardly along the blade and finally discharging from the rear end thereof onto the top of the bank rearwardly of the tractor. As the tractor advances, the spoil as discharged on top of the bank is engaged and spread by the spoil wing 44; the latter having previously been adjusted to a proper working position both about its vertical and horizontal axes of adjustment.

By reason of the connection of the longitudinal beam 25 with the extension arm 28 for relative motion about both transverse and vertical pivots, together with the cable suspension at the front end of said beam, the blade is free to float on, and thus maintain proper contact with, the ditch bank as the tractor advances.

For use to form irrigation control ridges or checks in a field, the beam 25 and blade 37 extend forwardly and outwardly in diverging relation to the line of travel, but are maintained substantially horizontal, as in Fig. 4. To prevent said beam and blade from swinging inwardly, a stay bar 52 is detachably connected between the hanger arm 32, as at 53, and a depending bracket 54 on the adjacent side of the arch frame 30, as at 55.

With the blade so set it works horizontally along the surface of the ground, cutting relatively shallow, with the cut earth working rearwardly along said blade and discharging into the path of the spoil wing 44; the latter then discharging the loose earth laterally and throwing it up as a ridge or check rearwardly of the advancing tractor.

When each blade assembly 24 is not in use it is swung inwardly to a transport position close to the adjacent side of the tractor 2, extending longitudinally substantially parallel to the line of travel. See the position of the left hand one of the blade assemblies in Fig. 2.

The described invention provides a very practical and effective earth working tool for the cleaning and grading of ditch banks; the formation of irrigation control ridges or checks in fields; and other earth working tasks well within the range of use of the implement. For example, the implement may be adapted for use as a road maintainer, particularly on roads having deep sloping side banks and bottom ditches which occasionally require cleaning out.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. An earth working implement comprising a frame adapted to be mounted on a tractor and having a part adjacent one side of the latter, an extension arm attached at its inner end to said part of the frame, the extension arm projecting laterally outward from the tractor, a diagonal stay bar connected between the extension arm and the frame, a longitudinal beam along said one side of the tractor, means mounting the beam at its rear end in connection with the outer end of the extension arm for lateral swinging adjustment to a forwardly diverging and selectively to a downwardly inclined working position, adjustable suspension means between the front end portion of the beam and the tractor, and a longitudinal blade secured to the beam on the side adjacent and facing the tractor; the extension arm being pivoted on said frame part for swinging adjustment about an upstanding axis to dispose the outer end of the arm different distances laterally out from the tractor, the diagonal stay bar being adapted to be positioned to permit such swinging adjustment of the extension arm.

2. An earth working implement comprising a frame adapted to be mounted on a tractor and having a part adjacent one side of the latter, an extension arm pivoted at its inner end on a vertical axis to said part of the frame for horizontal swinging movement, the extension arm projecting laterally outward from the tractor, a diagonal stay bar connected between the extension arm and the frame, a longitudinal beam along said one side of the tractor, means mounting the beam at its rear end in connection with the outer end of the extension arm for lateral swinging adjustment to a forwardly diverging and selectively to a downwardly inclined working position, adjustable suspension means between the front end portion of the beam and the tractor, a longitudinal blade secured to the beam on the side adjacent and facing the tractor, a spoil wing extending laterally inward from adjacent and rearwardly of the blade, and means, including connection with the extension arm, supporting the spoil wing from the frame.

3. In an earth working implement having a horizontal supporting arm adapted to be mounted on one side of a tractor and to project laterally out therefrom, and a longitudinal blade supported from the outer end of the arm; a spoil wing extending laterally inward from adjacent and rearwardly of the blade, a post secured to the outer end portion of the extension arm for swinging about an upstanding axis, means pivoting the adjacent end of the spoil wing to the post for vertical swinging adjustment of said spoil wing, an adjustable-length suspension member connected between an upper part of the post and an outer part of the spoil wing, and an adjustable-length draft member extending forward from the spoil wing to connection with the frame.

4. An earth working implement comprising a draft frame of generally U-shape adapted to straddle a tractor from the rear, means vertically adjustably securing the frame to the tractor, a longitudinal, earth working blade assembly extending along one side of the tractor, means mounting the blade assembly at the rear of an adjacent part of said frame for lateral swinging adjustment to a forwardly diverging and selectively to a downwardly inclined working position, adjustable length suspension means between the front portion of the blade assembly and the tractor, power means between the tractor and frame operative to vertically adjust the latter, and means to limit such adjustment of the frame; the tractor including a drawbar platform and a drawbar projecting to a termination rearwardly thereof, and said limiting means comprising a stop assembly mounted on and upstanding from the drawbar, the frame including a rear cross beam, and said stop assembly including vertically spaced stop members which extend above and below the rear cross beam of said frame.

5. An earth working implement comprising a frame adapted to be mounted on a tractor, an elongated blade alongside the tractor, means pivoting the blade at its rear end on the frame for angular adjustment, a spoil wing extending laterally inward from a point adjacent the rear end of the blade to receive material therefrom, means pivotally mounting the spoil wing at its end nearest the blade pivot means on the frame for angular adjustment, means to adjust the angular setting of the blade, and means to independently adjust the angular setting of the spoil wing.

6. An earth working implement comprising a frame adapted to be mounted on a tractor, a horizontal extension arm projecting laterally out and pivotally mounted at its inner end on the frame at one side of the tractor for swinging movement in a horizontal plane; an elongated blade at said one side of the tractor, means swivelly connecting the blade at one end to the outer end of the arm, and a spoil wing extending laterally inward and mounted in connection with the outer end of the extension arm to receive material from the adjacent end of the blade.

7. In an earth working implement, an implement-mounting draft frame of generally U-shape adapted to straddle a tractor from the rear, means pivoting the frame at its forward end on the tractor, the frame including a rigid rear cross member and the tractor having a drawbar-platform below and ahead of the cross member; and means between the platform and cross member to raise and lower the frame about its pivot means as an axis, said raising and lowering means comprising transversely spaced longitudinal arms above the platform and pivoted at their forward end on the back end of the tractor, links depending from the rear end of the arms and connected to the cross member, and upstanding hydraulic cylinder units on the platform under and engaging the arms intermediate their ends.

ERNEST V. BRISCOE.

References Cited in the file of this patent

UNITED STATES PATENTS

| Number | Name | Date |
| --- | --- | --- |
| 1,464,672 | Whittemore | Aug. 14, 1923 |
| 1,488,510 | Moats | Apr. 1, 1924 |
| 1,763,680 | Tellis | June 17, 1930 |
| 1,868,648 | Wells et al. | July 26, 1932 |
| 1,972,498 | Stevens | Sept. 4, 1934 |
| 2,032,088 | Gustafson | Feb. 25, 1936 |
| 2,134,848 | Anderson | Nov. 1, 1938 |
| 2,279,641 | Ross | Apr. 14, 1942 |
| 2,312,255 | Lowdermilk | Feb. 23, 1943 |
| 2,491,797 | Burns et al. | Dec. 20, 1949 |
| 2,512,114 | Robinson et al. | June 20, 1950 |